INVENTOR
CHARLES S. ASH

Nov. 20, 1945.   C. S. ASH   2,389,339
DUAL WHEEL ASSEMBLY
Filed Oct. 31, 1942   3 Sheets-Sheet 3

INVENTOR
CHARLES S. ASH
BY
ATTORNEY

Patented Nov. 20, 1945

2,389,339

UNITED STATES PATENT OFFICE 2,389,339

DUAL WHEEL ASSEMBLY

Charles S. Ash, Milford, Mich.

Application October 31, 1942, Serial No. 464,063

17 Claims. (Cl. 180—22)

The present invention relates to dual wheel assemblies and more particularly to heavy duty assemblies having dual, driven, independently rotatable dual wheels.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate one embodiment of the invention, and together with the description, serve to explain the principles of the invention.

Figure 1:
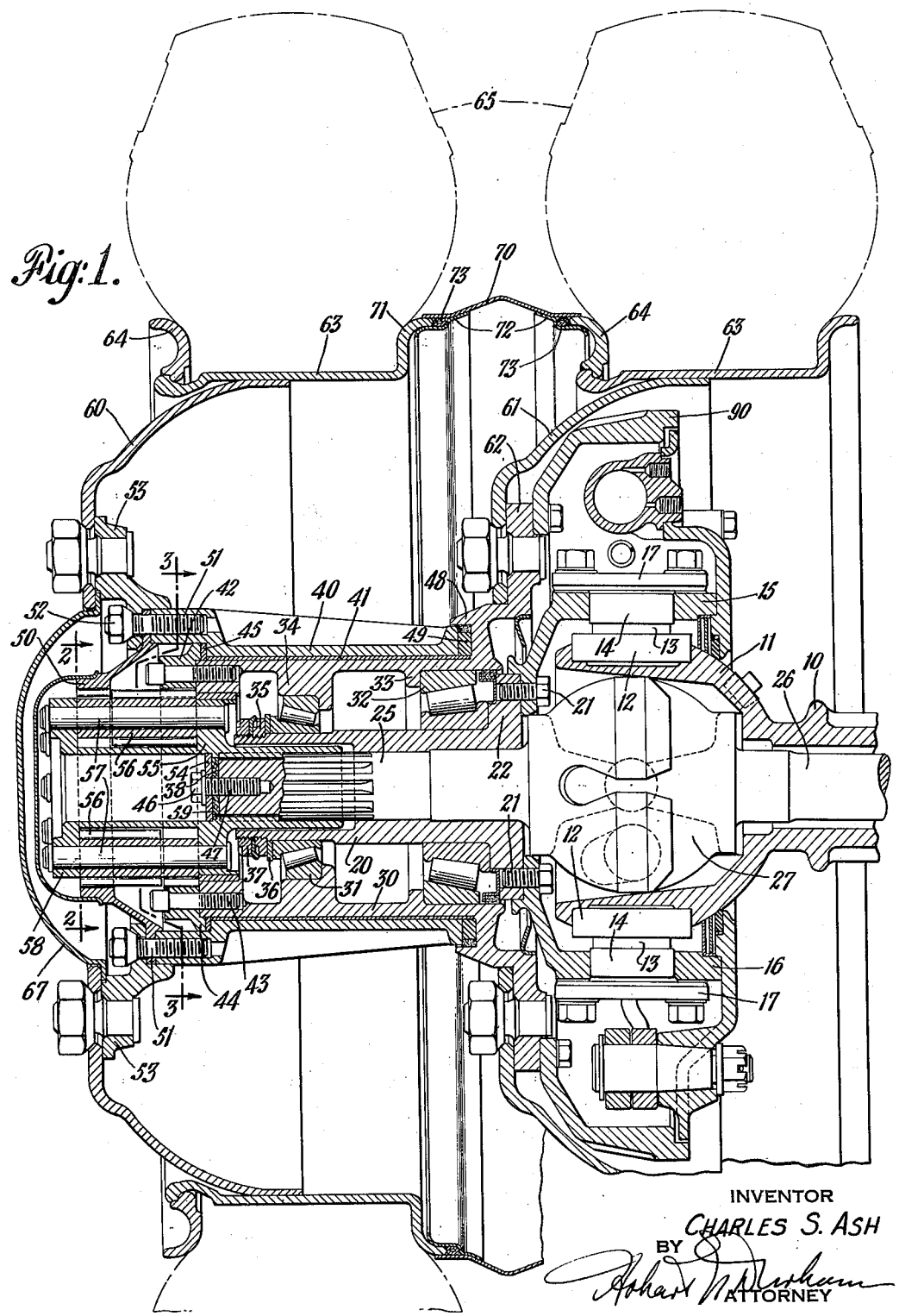
Fig. 1 is an axial vertical cross sectional view of a dual wheel assembly embodying the present invention.
Figure 2:
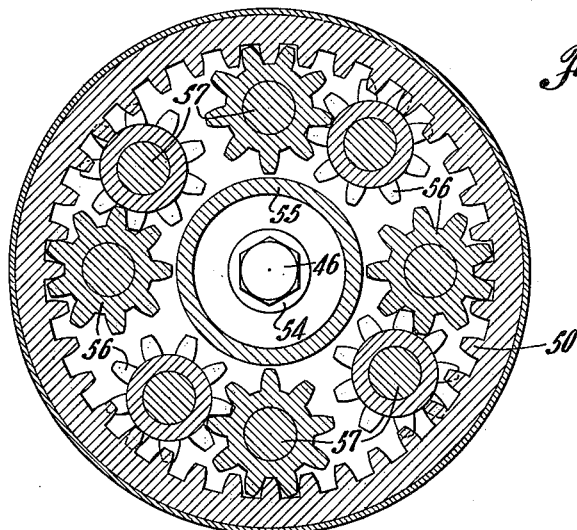
Fig. 2 is a transverse cross sectional view of the dual wheel assembly taken along line 2—2 of Fig. 1.
Figure 3:
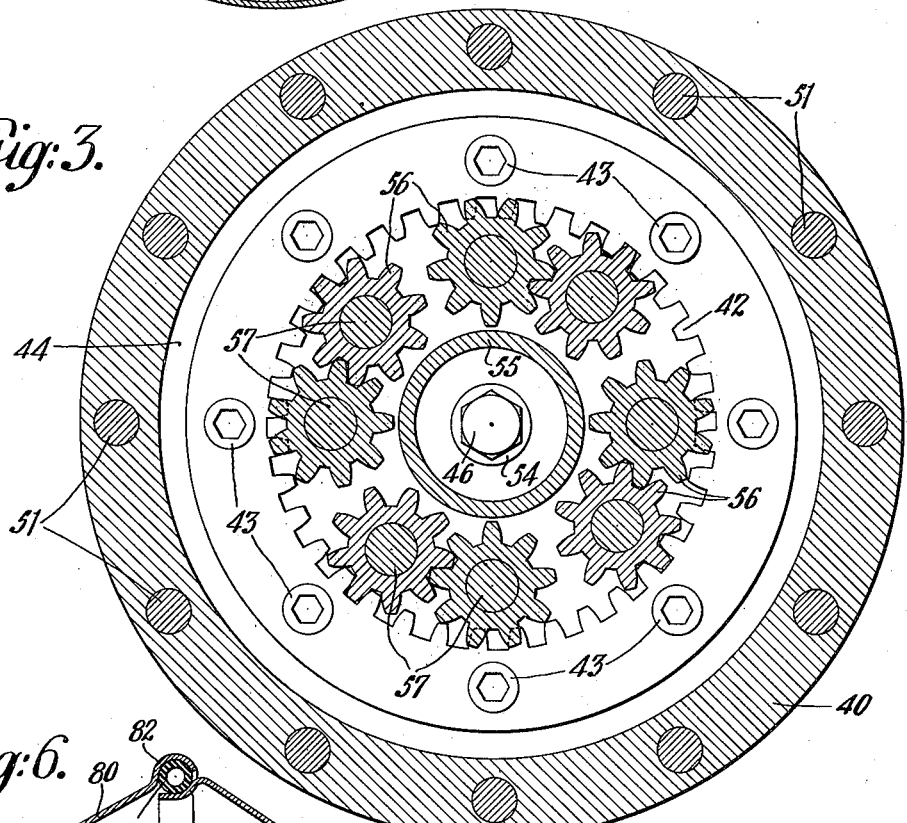
Fig. 3 is a transverse cross sectional view of the dual wheel assembly taken along line 3—3 of Fig. 1.

It is an object of the present invention to provide a dual wheel assembly for automotive vehicles in which the individual wheels of the assembly are independently rotatable and in which both wheels are driven from the motive power provided for the vehicle. Another object is the provision of a simple, efficient and durable driven, independently rotatable dual wheel assembly which is particularly adapted for use on heavy duty vehicles, and to those in particular which are confronted with difficult conditions off of established and adequate roadways. A further object is the provision of such a dual wheel assembly which may be easily, efficiently and cheaply applied to vehicles of present and existing design without extensive changes in construction, and utilizing wheels and other component parts likewise of existing design and therefore more available than specialized construction. The invention further provides a driven, independently rotatable dual wheel assembly having a sturdy and adequate and at the same time simple, compact and accessible differential between the respective wheels and the driving means of the assembly. A further object is the provision of such an assembly in which the differential means and other portions of the assembly are more available for assembly and disassembly and repair and replacement of component parts. Still another object is the provision of a dual wheel assembly suitable for use under the worst conditions of terrain and footing. The invention also provides a dual wheel assembly of the foregoing qualities and characteristics in which one wheel of the assembly may be sufficiently driven even though the other wheel has insufficient traction with the ground to cause the vehicle to move.

With these and other objects in view the present invention is shown by way of illustrative embodiment in the accompanying drawings as applied to the front or steering end of a vehicle. A front axle assembly of conventional design for vehicles in which the front wheels are to be driven may be provided and will comprise an axle housing having a differential mechanism at the center portion thereof supplying power to live axle shafts mounted within the axle housing and extending to either end thereof. At either end of the axle housing there is provided a hollow spindle which is mounted on the housing by yoke and king pin assembly for horizontal rotary movement about the housing in steering the vehicle. The live axle shafts of the axle housing drive live stub axle shafts mounted within the hollow spindle, and this drive takes place through any conventional universal joint driving assembly.

An elongated hub for the inner wheel of the dual wheel assembly is rotatably mounted by suitable anti-friction and thrust bearings upon the hollow spindle and at its inner end carries an outwardly extending annular flange portion on which a standard construction demountable at the hub or Budd type of wheel is mounted. This Budd type of wheel is a standard and widely used wheel for heavy duty vehicles when the wheel is to be demountable at its hub, and is deeply dished. The Budd wheel in the present dual wheel assembly for the inner wheel is mounted on its hub so that it is inwardly dished, and carries the usual pneumatic tire mounting rim at its outer periphery.

A second elongated hub for the outer wheel of the assembly of slightly greater diameter than the inner wheel hub is journalled on the finished outer cylindrical surface of the latter hub for relative rotation with respect thereto. At its outer end the outer wheel hub has a removable outwardly extending annular flange on which the outer Budd type wheel is demountably mounted. The outer Budd wheel is likewise mounted to be inwardly dished and provided with a tire rim.

A differential mechanism is provided for driving the inner and outer wheels of the assembly from the live stub axle shaft in the hollow spindle, and according to one of the present illustrative embodiments of the invention comprises a cylindrical driving member connected to the stub axle shaft to be driven thereby and extending axially outwardly therefrom and beyond the end of the hollow spindle. The cylindrical driving member carries a plurality of sets of spur pinion gears which are rotatably mounted on axially extending parallel pins mounted in carriers on the outside of the driving member. Each set of spur pinion gears comprises two gears which are mounted on two of the parallel pins mentioned in axially staggered relationship, being in mesh one with the other along the overlapping length of their adjacent ends. An internally extending annular ring gear is provided on the outer end of each of the wheel hubs, and these gears are removably fixed to their respective hubs. The ring gears are internally toothed and of the same diameter, and are in spaced apart axial relationship, the ring gear for the outer wheel hub being on the outside of the ring gear for the inner wheel hub. Each ring gear is in mesh with a respective spur pinion of each set of said pinions, and a differential driving relationship is thereby effected between the driven stub axle shaft and the two wheels of the dual wheel assembly.

A substantial concave cover plate is fitted over the end of the differential assembly and against the annular flange on the outer end of the outer wheel hub, and this plate and the inwardly dished contour of the outer wheel form a generally convex surface for the outer end of the dual wheel assembly, this surface extending outwardly of the outer wall of the tire mounted on the outer wheel. An annular shield may be provided between adjacent peripheries of the tire carrying rims for the respective wheels of the assembly, and this shield is so mounted on the rims that it is steadily positioned but differential action of the wheels is not impeded.

In another illustrative embodiment of the differential means of the present invention there is provided a cylindrical driving member connected to the stub axle shaft and extending beyond the end of the hollow spindle. Pinion gears are mounted on the end of the driving member on radially extending axes, and these gears each mesh with a pair of ring gears one of which is connected to each of the wheel hubs for correlative rotation therewith. These ring gears have axially extending teeth and are positioned one on either side of the pinion gears. The pinion gears are eccentrically mounted on the cylindrical driving member, and the pitch lines of the ring gears are non-planar and correspond to the pitch line of the pinion, whereby a variable leverage differential is provided for the wheel hubs of the assembly.

It will be understood that the foregoing general description and the following detailed description as well are exemplary and explanatory of the invention but are not restrictive thereof.

Referring specifically to the illustrative embodiment of the present invention shown in Fig. 1, the driven differential dual wheel assembly is shown as mounted on the end of an axle housing 10 at the front or steering end of a vehicle. The axle housing 10 at its end carries an integral spherical knuckle 11 having circular recesses on its upper and lower faces to receive bearings 12 in which are journalled the king pins 13. The enlarged head portions 14 of the upper and lower king pins 13 are journalled in circular apertures in upper and lower yoke arms 15 and 16 respectively, and securely held therein by caps 17 bolted to the yoke arms. A hollow axle end or spindle 20 having an integral outwardly extending flange 22 is mounted on the yoke arms 15 and 16 by means of cap screws 21, extending into the flange, and the spindle 20 is thereby mounted for steering movement about the front axle housing 10. A live stub axle shaft 25 is journalled for rotation within the spindle 20, and is driven from the live axle shaft 26 in the front axle housing 10, through a conventional universal joint driving assembly indicated generally by numeral 27.

An elongated hub 30 to mount the inner wheel of the assembly, as hereinafter described, is rotatably mounted upon the spindle 20 by means of a pair of tapered roller bearings 31 and 32. The inner race of the inner bearing 32 is seated against the flange portion 22 of the spindle, and the outer race thereof is seated against an inwardly extending shoulder 33 of the hub 30. The outer race of the outer bearing 31 is seated against another inwardly extending shoulder 34 of the hub 30, and the bearings and hub are all retained securely in assembled position by a retaining nut 35 threaded on the end of spindle 20 and seating against the inner race of bearing 31, a washer 36 being interposed therebetween. A lock nut 37 may also be positioned on the end of the spindle for the further secure holding of the assembly.

The elongated hub 40 for the outer wheel is journalled on the finished outer cylindrical surface of the inner wheel hub 30, an anti-friction bushing 41 being interposed. The inner wheel hub 30 carries an inwardly extending annular ring gear 42, removably secured to its outer end by means of cap screws 43, and an outwardly extending portion 44 of the ring gear serves as a sturdy anti-thrust bearing between the hubs 30 and 40, a bearing ring 45 being interposed. The forces of axial thrust at the inner ends of the hubs are taken by the integral outwardly extending annular members 48 of the inner wheel hub 30, the enlarged end of the outer wheel hub 40 being journalled in an annular groove therein with an interposed bearing ring 49.

The outer wheel hub carries, at its outer end, an inwardly extending internally toothed ring gear 50 which is removably secured thereto by bolts 51 and nuts 52, the latter also serving to removably mount an annular wheel mounting member 53 upon the hub 40 for rotation therewith. The outer wheel hub ring gear 50 is flared or outwardly extended so that its internal gear teeth are positioned substantially outwardly and spaced apart from the internal gears of ring gear 42, and the internal gear teeth of these ring gears lie in substantially the same cylindrical plane.

The differential driving means between the live stub axle 25 and the wheel hubs 30 and 40, according to the present illustrative embodiment of the invention, further comprises the cylindrical driving member 55 which is splined at its inner end to mesh with the end of stub shaft 25. The driving member 55 extends axially beyond the end of the axle end or spindle 20 and at its outer end carries a plurality of sets of spur pinion gears, each spur pinion gear 56 being mounted thereon by means of axially extending pins 57 carried in hangers 58 integral with the driving member. Each set of spur pinion gears comprises two of such gears 56, and these gears are untoothed for a portion of their length at their respectively opposite ends, whereby each spur pinion gear of the set may be in mesh with the other along their overlapping toothed lengths, and each is likewise in mesh with a separate one of the ring gears 42 and 50. The driving member 55 is held in its place upon stub shaft 25 by means of an inwardly extending shoulder portion 59 which is held between the end of the stub shaft and a retaining washer 54 secured to the stub shaft by the bolt 47 and nut 46. A fiber washer 38 may be interposed to allow some flexibility in the connection. Thus a compact, sturdy, simple and easily accessible differential is provided between the vehicle power means and the two wheel hubs for the wheels of the dual wheel assembly.

The wheels, 60, 61 for the outer and inner wheel hubs respectively are of the demountable at the hub type and are of a standard and widely used construction, being known as the Budd type of wheel. These wheels are deeply dished and, as shown in Fig. 1, are so positioned on their respective hubs as to be inwardly dished or inclined. The outer wheel 60 is demountably mounted on the annular wheel mounting member 53, while the inner wheel 61 is demountably mounted upon an integral annular wheel supporting member 62 on the inner end of hub 30, said member being formed as an outwardly extending portion of the annular bearing member 48. The wheels are each provided at their outer peripheries with the standard and conventional pneumatic tire carrying rims 63 having removable split retaining rings 64 for the easy mounting of the tires 65. A driven dirigible, independently rotatable dual wheel assembly is thus provided in which standard and readily available parts are utilized, for the most part, and the differential and hub assembly and construction of the invention allows the spacing between the centerlines of the treads of tires 65 to be the same as found in standard and usual dual wheel assemblies in which the wheels, however, are rigidly fixed together for correlative rotation.

The differential and hub assembly of the present invention further provides for the mounting of the outer wheel 60 at the outer end of the assembly and for its mounting in an inwardly dished fashion, rather than outwardly dished as is customary for rigid dual wheel assemblies, still maintaining the advantage of standard spacing between the centerlines of treads of the tires. Thus the differential and hub assembly does not extend to any substantial degree outwardly of the outermost portion of the web of wheel 60, while the web of that wheel curves inwardly toward the plane of the outer wall of its tire 65. A substantial circular shield member 67 is positioned over the end of the wheel and hub assembly and is held in position by wheel 60 and its mounting bolts. The shield 67 is convexly formed and its curvature cooperates with the inward curvature of the web of wheel 60 to form a continuous outwardly extending surface from the outer wheel rim 63 over the end of the differential and hub assembly, said surface extending beyond the outer wall of outer tire 65.

The structure and assembly just described is particularly important and advantageous for use on heavy duty vehicles which are obliged to go beyond established roads where they encounter difficult conditions of extremely soft footing such as deep mud, sand and similar substances. Such are the conditions which are often presented to Army vehicles of all types and commercial vehicles used, for instance, in oil field work, and it will be apparent that a substantially greater buoyancy as well as desirable and necessary streamlining is given to the assembly by an outwardly curving surface from the tires which is not afforded by the usual assembly in which an outwardly dished wheel is mounted having a sharply out-jutting hub at its center.

The advantages described are further enhanced and difficult conditions further met in the wheel assembly of the present invention by the provision of means between the wheels for preventing the loading up of mud and sand in the assembly and for its further buoying up and streamlining. This means, as illustratively shown in Fig. 1, comprises a cylindrical shield 70 of slightly angular cross section slightly overlapping and supported upon the split ring 64 of the inner wheel rim and the fixed tire retaining ring 71 of the outer wheel rim. Annular clips 72 are fixed to the inner ends of shield 70, and these are adapted to snap over the adjacent tire retaining rings 64, 71 and sturdily position the shield, at the same time allowing for the free independent rotation of the wheels. Circular flexible rings 73 may be positioned in the grooves formed by the annular clips 72 with shield 70 to prevent access of moisture and dust to the inner part of the assembly.

Figure 6:
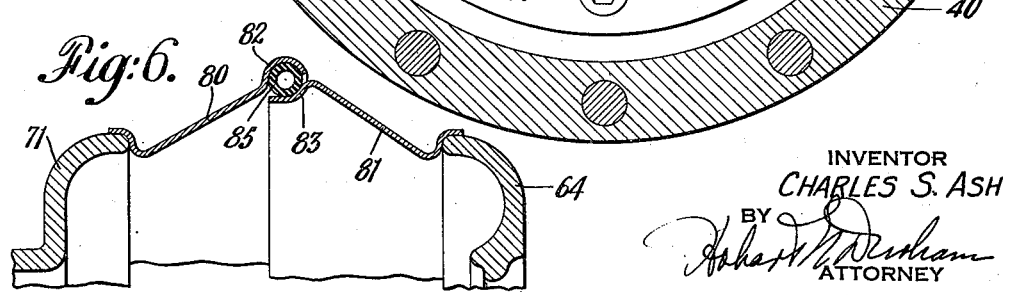
Fig. 6 is a detail cross sectional view of another embodiment of certain portions of the dual wheel assembly shown in Figs. 1 and 4.

Another illustrative embodiment of shielding means between the wheels is shown in Fig. 6, and this embodiment comprises a pair of outwardly extending annular shields 80 and 81 having curved end portions for engagement over tire retaining rings 71 and 64 respectively. At their adjacent ends the annular shields terminate in oppositely curved portions 82, 83, which form a substantially circular groove in which is positioned a substantial, flexible tubular sealing ring 85 for sealing off the center portion of the assembly.

Braking means for the assembly as illustratively shown in Fig. 1, comprises a brake drum 90 fixed to the inner wheel supporting member 62, and any suitable and conventional friction means may be provided for exerting a retarding force upon the brake drum.

Figure 4:
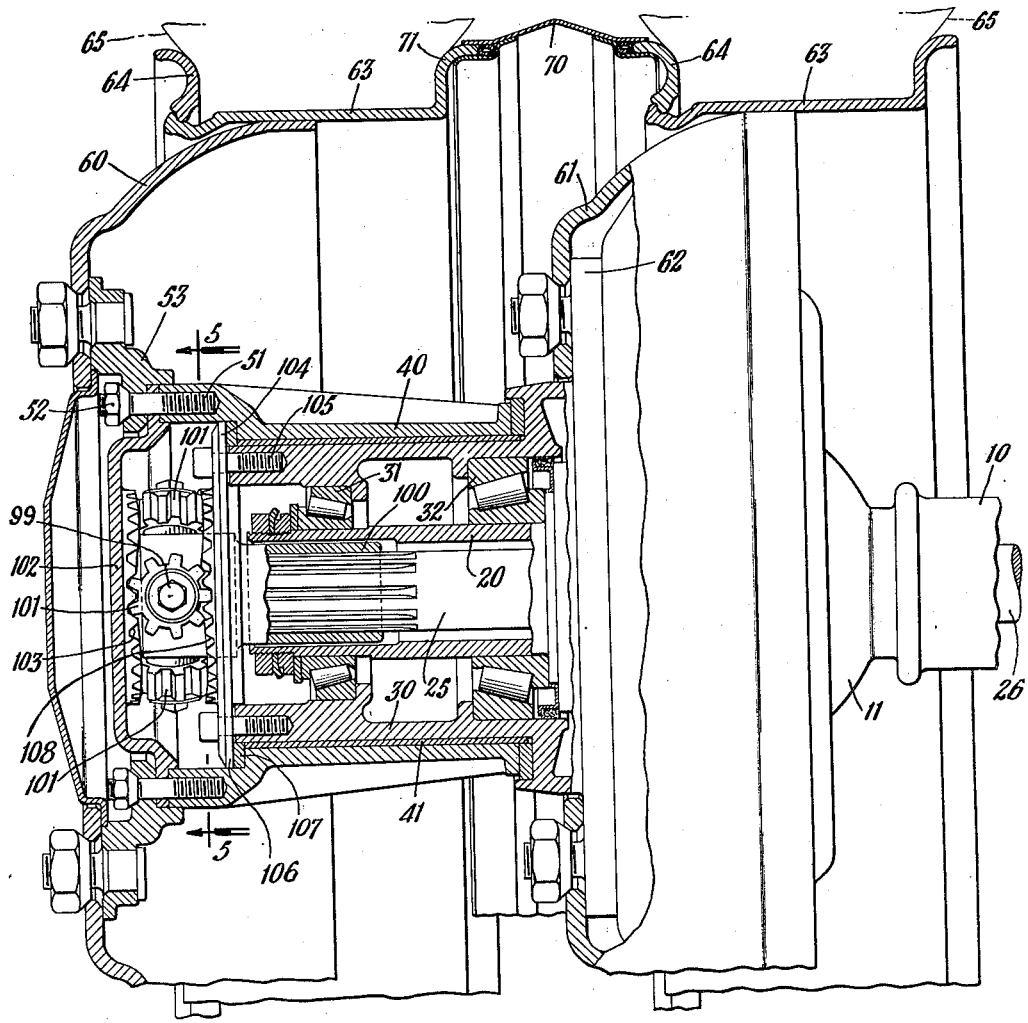
Fig. 4 is a side view of another embodiment of the present invention certain portions being shown in cross section and others in elevation.
Figure 5:
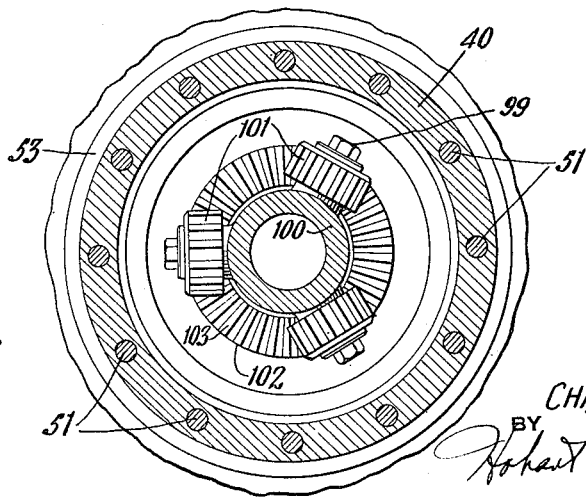
Fig. 5 is a transverse cross sectional view of the embodiment of Fig. 4 taken along line 5—5 of Fig. 4.

Another illustrative embodiment of the differential driving means of the present invention is shown in Figs. 4 and 5 of the drawings. As shown in Fig. 4, a cylindrical driving member 100 is provided to be driven by the stub shaft 25, and carries at its end projecting out of hollow spindle 20 a plurality of rotatable pinion gears 101 to turn about radially extending axes or stubs 99. The annular ring gear 102 for the the outer wheel hub 40 is fixed thereto by the bolts 51 and nuts 52 and has the axially inwardly extending gear teeth 103.

The ring gear 104 for the inner wheel hub 30 is secured thereto by the bolts 105, and the peripheral portion 106 of the gear provides a shoulder to take the forces of axial thrust of the outer wheel hub 40, the annular thrust bearing ring 107 being interposed. The gear teeth 108 of ring gear 104 are outwardly axially extending, and they and the gear teeth 103 are in mesh with each of the pinions 101.

The pinion gears 101 are eccentrically mounted upon the driving member 100, the axes of rotation of the pinion gears 101 being displaced slightly from the true geometrical center of the gear, so that as shown in Figure 4 the teeth of the pinion which is seen end-on extend further to the left of the mounting studs 99 than to the right, and after one-half rotation will, of course, extend further to the right than to the left. As may be seen in Figure 4, the gear teeth 103 and 108 of the ring gears 102 and 104 have a non-planar pitch line, and their pitch lines deviate from a true plane in accordance with the eccentricity of the eccentrically mounted pinion gears 101. There is thus provided a variable leverage differential for the dual wheels of the assembly, and this type of differential gearing is extremely useful when one of the wheels of the assembly is on a slippery footing, is raised out of contact with the ground or for some other reason is not afforded sufficient traction. In this situation enough power will still be transmitted to the other wheel to move the vehicle to a position where both wheels again have the necessary traction.

It will be apparent that the dual wheel assembly of the present invention is adapted to be used in connection with the front or steering axle of vehicles of widely used and conventional construction, and requires no substantial changes in their design. It may also be seen that standard Budd type wheels may be utilized, and these facts present particular advantages at the present time when mass standardized production is being sought in army vehicles of all kinds. The present invention provides the advantages of driven independently rotatable dual wheels for heavy duty army vehicles with a minimum of change over and adaptation.

It may also be observed that by reason of the hub and differential assembly of the present invention the wheels are so mounted that the tires are standardly spaced apart, and, further, are so positioned axially with relation to the king pin and driving universal joint that the wheels may track with the rear dual wheel assemblies customarily provided for such vehicles. This is advantageous and important in that the dual wheel assemblies along the same side of a vehicle make a single dual track through mud and sand, as against three or four tracks which must be made if the wheel assemblies front and rear do not track, with a consequent waste of power. Moreover, the hub and differential assembly of the invention provides for the mounting of the outer wheel in a manner to contribute materially to the efficiency of the assembly in sand and mud, and this is supplemented by shields between the wheels of the assembly.

The differential driving means of the present invention is extremely compact and may thus be conveniently mounted at the outer end of the stub shaft 25 and hollow spindle 20 without interfering with other elements of the assembly in the positions it is necessary for them to have. The differential gearing is of smaller overall diameter than either of the wheel hubs 30 and 40, which permits the broad spacing of the wheel mounting members 53 and 62 so that the wheels may both be mounted inwardly dished and maintain the proper spacing between the tires. The gearing means is also of substantially smaller overall diameter than the inner periphery of the demountable-at-the-hub Budd wheels 60 and 61, permitting these wheels to be demounted without disturbing the differential. This feature also prevents the differential from extending axially outwardly beyond the web of the outer wheel 60, and this materially increases the streamlining of the assembly and hence its usefulness for heavy duty vehicles such as army prime movers. The position of the differential at the end of the assembly likewise allows the convenient repair and replacement of parts without disturbing the wheel hubs and other parts of the assembly.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheel assembly comprising, in combination, a vehicle axle, a live shaft within the axle to be driven by the vehicle power means, a first wheel hub rotatably mounted on the end of the axle, a second wheel hub rotatably mounted on the first hub, an inwardly dished demountable at the hub wheel mounted on the inner end of the first hub, another inwardly dished demountable at the hub wheel mounted on the outer end of the second wheel hub, and differential gearing means between the live shaft and the two wheel hubs, the overall diameter of said differential gearing means being less than the inner diameter of said wheels.

2. A dual wheel assembly comprising, in combination, a vehicle axle, a live shaft within the axle to be driven by the vehicle power means, a first wheel hub rotatably mounted on the end of the axle, a second wheel hub rotatably mounted on the first hub, differential gearing means between the live shaft and the two wheel hubs beyond the end of the axle, an inwardly dished demountable at the hub wheel mounted on the inner end of the first hub, a second inwardly dished demountable at the hub wheel mounted on the outer end of the second wheel hub substantially radially outwardly of the differential gearing means, the overall diameter of the differential gearing means being less than the inner diameter of the second demountable at the hub wheel.

3. A dual wheel assembly comprising, in combination, a vehicle axle, a live shaft within the axle to be driven by the vehicle power means, a substantially cylindrical first wheel hub rotatably mounted on the end of the axle, a substantially cylindrical second wheel hub rotatably mounted on the first hub, and differential gearing means between the live shaft and the two wheel hubs, the overall diameter of said means being less than the overall diameter of the wheel hubs.

4. A dual wheel assembly comprising, in combination, a vehicle axle, a live shaft within the axle to be driven by the vehicle power means, a substantially cylindrical first wheel hub rotatably mounted on the end of the axle, a substantially cylindrical second wheel hub rotatably mounted on the first hub, and differential gearing means between the live shaft and the two wheel hubs, the overall diameter of said means being less than the outer diameter of the first wheel hub.

5. A dual wheel assembly for a vehicle comprising, in combination, an axle end, a live shaft in the axle end to be driven by the vehicle power means, a pair of wheel hubs rotatably mounted on the axle end for independent relative rotation, and differential driving means between the live shaft and the wheel hubs, said means comprising an inwardly extending internally toothed annular ring gear on each hub for correlative rotation therewith, a driving member driven by the live shaft, and a pair of spur pinion gears mounted on the driving member, each of said spur pinion gears being in mesh with the other and with a respective ring gear.

6. A dual wheel assembly for a vehicle comprising, in combination, an axle end, a live shaft in the axle end driven by the vehicle power means, a pair of wheel hubs rotatably mounted on the axle end for independent relative rotation, and differential driving means between the live shaft and the wheel hubs, said means comprising a ring gear on each hub for correlative rotation therewith, a driving member on the live shaft to be driven thereby, said driving member extending axially outwardly beyond the end of the axle end, and a pair of spur pinion gears carried by the driving member beyond the end of the axle end, each of said spur pinion gears being in mesh with the other and with a respective ring gear.

7. A dual wheel assembly for a vehicle comprising, in combination, an axle end, a live shaft in the axle end driven by the vehicle power means, a first wheel hub rotatably mounted on the axle end, a second wheel hub rotatably mounted on the first wheel hub and differential driving means between the live shaft and the wheel hubs, said means comprising a ring gear on each hub for correlative rotation therewith, a driving member connected to the live shaft to be driven thereby, said driving member extending axially outwardly beyond the ends of the axle end and wheel hubs, and a pair of spur pinion gears carried by the driving member beyond the ends of the axle end and wheel hubs, each of said spur pinion gears meshing with the other and with a respective ring gear, the overall diameter of the driving member and the spur pinion gears carried thereby being smaller than the inner diameter of the second wheel hub whereby the second wheel hub may be removed outwardly over the driving member and spur pinion gears.

8. A dual wheel assembly for a vehicle comprising, in combination, an axle end, a live shaft in the axle end driven by the vehicle power means, a first elongated wheel hub rotatably mounted on the axle end, a second elongated wheel hub journalled on the first hub for independent relative rotation, and differential driving means between the live shaft and the wheel hubs comprising a pair of inwardly extending internally toothed annular ring gears removably secured respectively to the outer end of each wheel hub, a driving member secured to the live shaft against relative rotary but for relative axial movement with respect thereto, said driving member extending axially outwardly beyond the ends of the axle end and the wheel hubs, a pair of spur pinion gears carried by the driving member beyond the ends of the axle end and wheel hubs, each of said spur pinion gears meshing with the other and with a respective ring gear, the overall diameter of the driving member and the spur pinion gears carried thereby being less than the inner diameter of the second wheel hub.

9. A dual wheel assembly for a vehicle comprising, in combination, an axle end, a live shaft in the axle end to be driven by the vehicle power means, a pair of wheel hubs rotatably mounted on the axle end for independent relative rotation, and differential gearing means between the live shaft and the wheel hubs, said means comprising a ring gear having axially extending teeth connected to each hub for correlative rotation therewith and a pinion gear in mesh with said ring gears connected to the live shaft to be driven thereby, the overall diameter of the differential gearing means being less than the outer diameter of either of the wheel hubs.

10. A dual wheel assembly for a vehicle comprising, in combination, an axle end, a live shaft in the axle end driven by the vehicle power means, a first elongated wheel hub rotatably mounted on the axle end, a second elongated wheel hub journalled on the first hub for independent relative rotation, an inwardly dished demountable at the hub wheel mounted on the inner end of the first wheel hub, another inwardly dished demountable at the hub wheel mounted on the outer end of the second wheel hub, and means for differentially driving the wheel hubs from the live shaft including differential gearing means at the outer ends of the axle end and wheel hubs.

11. A dual wheel assembly for a vehicle comprising, in combination, an axle end, a live shaft in the axle end driven by the vehicle power means, a pair of wheel hubs mounted in telescoped relationship on the axle end for independent relative rotation, an inwardly dished demountable at the hub disk wheel demountably mounted on the inner end of one of said hubs, another inwardly dished demountable at the hub disk wheel demountably mounted on the outer end of the other hub, and differential driving means interconnecting the live shaft and the two wheel hubs including differential gearing means beyond the outer ends of the axle end and the wheel hubs.

12. A dual wheel assembly for a vehicle comprising, in combination, an axle end, a live shaft in the axle end driven by the vehicle power means, a first elongated wheel hub rotatably mounted on the axle end, a second elongated wheel hub journalled on the first hub for independent relative rotation, an inwardly dished demountable at the hub disk wheel demountably mounted on the inner end of the first wheel hub, another inwardly dished demountable at the hub disk wheel demountably mounted on the outer end of the second wheel hub, and differential driving means between the live shaft and the wheel hubs comprising a pair of inwardly extending internally toothed side by side annular ring gears each connected to the outer end of a respective wheel hub for rotation therewith, a driving member connected to the live shaft and axially extending outwardly beyond the ends of the axle end and the wheel hubs, and a pair of spur pinion gears on the driving member beyond the ends of the axle end and wheel hubs, each of said gears being in mesh with the other and with a respective one of said ring gears.

13. A dual wheel assembly for a vehicle comprising, in combination, an axle end, a live shaft in the axle end to be driven by the vehicle power means, a pair of wheel hubs rotatably mounted on the axle end for independent relative rotation, and variable leverage differential driving means between the live shaft and the wheel hubs.

14. A dual wheel assembly for a vehicle comprising, in combination, an axle end, a live shaft in the axle end to be driven by the vehicle power means, a pair of wheel hubs rotatably mounted on the axle end for independent relative rotation; and variable leverage differential driving means between the live shaft and the wheel hubs, said means comprising an eccentrically mounted pinion gear to be driven by the live shaft and a pair of ring gears meshing with the pinion gear one connected with each wheel hub for correlative rotation therewith said ring gears having non-planar pitch lines corresponding to the pitch line of the eccentrically mounted pinion gear.

15. A dual wheel assembly for a vehicle comprising, in combination, an axle end, a live shaft in the axle end driven by the vehicle power means, a pair of wheel hubs rotatably mounted in telescoped relationship upon the axle end for independent relative rotation, an inwardly dished disk demountable at the hub wheel mounted on the inner end of one of said wheel hubs, a second inwardly dished disk demountable at the hub wheel mounted on the outer end of the other wheel hub, differential driving means interconnecting the live shaft and the wheel hubs, annular tire carrying rims on the two wheels, and a substantially cylindrical shield means supported on adjacent annular portions of said rims, said shield means being independently relatively rotatable with at least one of said tire rims.

16. A dual wheel assembly for a vehicle comprising, in combination, an axle end, a live shaft in the axle end driven by the vehicle power means, a pair of wheel hubs rotatably mounted in telescoped relationship upon the axle end for independent relative rotation, an inwardly dished demountable at the hub disk wheel demountably mounted on the inner end of one of said wheel hubs, a second inwardly dished demountable at the hub disk wheel demountably mounted on the outer end of the other wheel hub, differential driving means connecting the live shaft and the wheel hubs and including differential gearing means axially outwardly of the ends of the axle end and the wheel hubs, an annular tire carrying rim on each of the wheels, and a substantially cylindrical shield member between the rims slidingly supported by adjacent annular portions of said rims.

17. The combination with a pair of side by side coaxial independently rotatable dual wheels having annular tire supporting rims of a shield member between adjacent portions of the rims, said shield member comprising a pair of frusto conical members each having an outwardly flared annulus at its smaller end to be supported on the outer periphery of a respective rim, said members having overlapping portions at their larger ends, and an annular flexible bearing and sealing ring between said overlapping portions.

CHARLES S. ASH.